(12) United States Patent
Kusase et al.

(10) Patent No.: US 6,731,081 B2
(45) Date of Patent: May 4, 2004

(54) VEHICLE ALTERNATOR HAVING RECTIFIER CIRCUIT USING DIODE AND FET

(75) Inventors: Shin Kusase, Obu (JP); Tsutomu Shiga, Nukata-gun (JP)

(73) Assignee: Denso Corporation, Kariya (JP)

( * ) Notice: Subject to any disclaimer, the term of this patent is extended or adjusted under 35 U.S.C. 154(b) by 104 days.

(21) Appl. No.: 10/101,733

(22) Filed: Mar. 21, 2002

(65) Prior Publication Data
US 2002/0163260 A1 Nov. 7, 2002

(30) Foreign Application Priority Data

May 1, 2001 (JP) .......................... 2001-133877
Jan. 10, 2002 (JP) .......................... 2002-003238

(51) Int. Cl.$^7$ ............................................. H02K 29/00
(52) U.S. Cl. ........................ 318/140; 322/28; 318/158
(58) Field of Search ................................ 318/140, 141, 318/147, 156, 157, 158; 322/28

(56) References Cited

U.S. PATENT DOCUMENTS

| 5,780,996 | A | * | 7/1998 | Kusase et al. | 322/28 |
| 5,793,625 | A | * | 8/1998 | Balogh | 363/89 |
| 5,808,451 | A | * | 9/1998 | Endou et al. | 322/24 |
| 5,936,855 | A | * | 8/1999 | Salmon | 363/46 |
| 6,239,582 | B1 | * | 5/2001 | Buzan et al. | 322/20 |

* cited by examiner

Primary Examiner—Bentsu Ro
(74) Attorney, Agent, or Firm—Oliff & Berridge, PLC

(57) ABSTRACT

A vehicle alternator includes a permanent magnet rotor, a stator having armature coils, and a rectifier circuit. In the rectifier circuit, schottky barrier diodes and FETs are connected in series so that the forward directions of the schottky barrier diodes and parasitic diodes of the MOSFETs are opposite. The schottky barrier diodes are connected between the MOSFETs and the armature coils.

9 Claims, 1 Drawing Sheet

VEHICLE ALTERNATOR HAVING RECTIFIER CIRCUIT USING DIODE AND FET

CROSS REFERENCE TO RELATED APPLICATION

This application is based on and incorporates herein by reference Japanese Patent Applications No. 2001-133877 filed May 1, 2001, and No. 2002-3238 filed Jan. 10, 2002.

FIELD OF THE INVENTION

The present invention relates to a vehicle alternator that uses permanent magnets in a rotor and is mounted in passenger cars, trucks and the like.

BACKGROUND OF THE INVENTION

It is proposed to use permanent magnets in a rotor of a vehicle alternating current generator (alternator) so that the alternator has less loss, because the permanent magnets have no excitation loss. However, as the permanent magnets generate fixed magnetic field, the output power generation of the alternator must be regulated by shorting output voltages generated by armature coils of the alternator (shorting control) or by cutting off a part of the output voltages (phase control). For these controls, electronic switching devices such as a silicon controlled rectifier (SCR) and a field effect transistor (FET) are used.

The SCR has a forward loss that is twice as large as that of a silicon diode, and does not withstand high temperatures. Therefore, SCRs are not suited to the alternators.

Field effect transistors (FETs), on the other hand, have less loss and withstand high temperatures as opposed to SCRs. However, as the FET has a parasitic diode, which allows electric current to flow, the output current of the alternator cannot be interrupted. Hence the electric power generation of the armature coils of the alternator cannot be regulated. Further, the FET does not withstand high voltages, and the output voltage generated by the armature coil often exceeds this withstanding voltage. Therefore, the FETs are likely to be damaged.

SUMMARY OF THE INVENTION

It is therefore an object of the present invention to provide a vehicle alternator that is capable of regulating its output power generation while using FETs.

According to the present invention, a vehicle alternator comprises a permanent magnet rotor, a stator having armature coils, and a rectifier circuit. In the rectifier circuit, FETs and low forward voltage diodes such as Schottky barrier diodes are connected in series so that the forward directions of the low forward voltage diodes and parasitic diodes of the MOSFETs are opposite. The low forward voltage diodes are connected between the MOSFETs and the armature coils.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
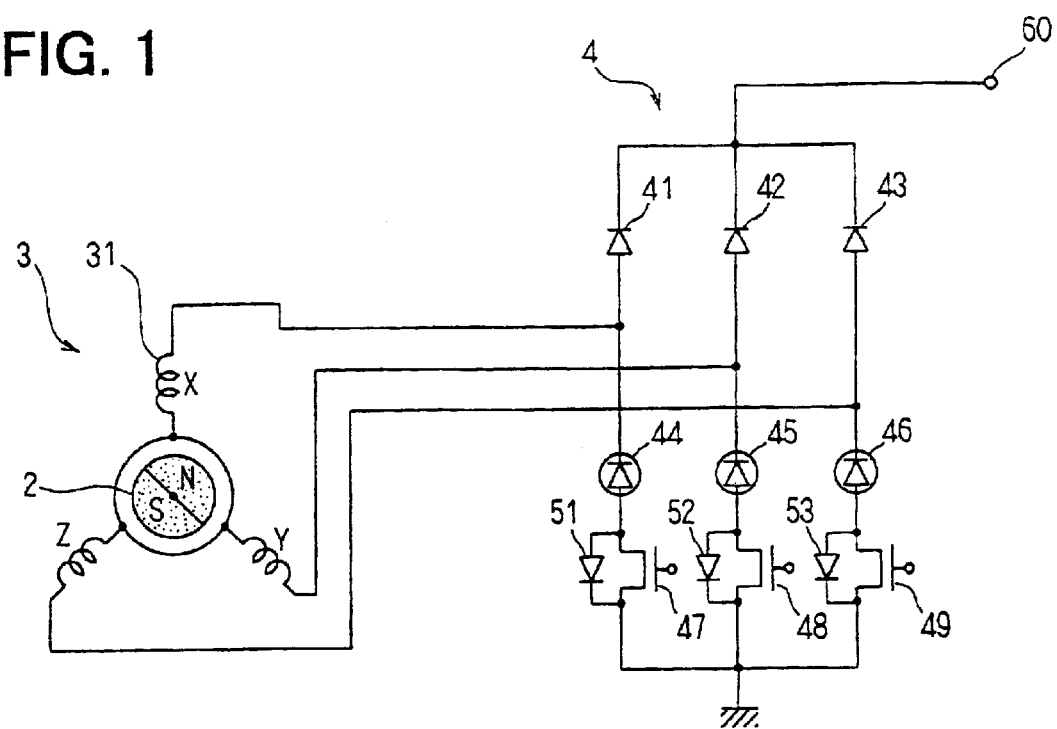
FIG. 1 is an electric wiring diagram showing an alternator according to the present invention.

Referring first to FIG. 1, an vehicle alternator comprises a rotor 2 having a permanent magnet, a stator 3 having three armature coils 31 of X-phase, Y-phase and Z-phase, and a rectifier circuit 4. The circuit 4 is for rectifying three-phase alternating current voltages generated by the armature coils 31 to a direct current voltage and regulating the output power generation of the alternator by interrupting the output current of the alternator.

The rectifier circuit 4 is constructed with three diodes 41, 42, 43, three Schottky barrier diodes 44, 45, 46, and three MOSFETs 47, 48, 49 as switching devices. Those circuit components are connected in a three-phase bridge configuration. The MOSFETs 47, 48, 49 have parasitic diodes 51, 52, 53, respectively.

Specifically, the diode 41, Schottky barrier diode 44 and MOSFET 47 are connected in series in this order. The diode 41 and Schottky barrier diode 44 are connected such that the forward directions of the same are identical. The cathode of the diode 41 is connected to an output terminal 60 of the alternator, which is connected to electric loads and a storage battery of a vehicle. The anode of the Schottky barrier diode 44 is connected to the ground through the MOSFET 47. The parasitic diode 51 of the MOSFET 47 is set to have its forward direction in opposition to that of the Schottky barrier diode 44. One output end of the X-phase armature coil 31 is connected to the junction between the anode of the diode 41 and the cathode of the Schottky barrier diode 44.

Similarly, the diode 42, Schottky barrier diode 45 and MOSFET 48 are connected in series in this order. The diode 42 and Schottky barrier diode 45 are connected such that the forward directions of the same are identical. The cathode of the diode 42 is connected to the output terminal 60 of the alternator. The anode of the Schottky barrier diode 45 is connected to the ground through the MOSFET 48. The parasitic diode 52 of the MOSFET 48 is set to have its forward direction in opposition to that of the Schottky barrier diode 45. One output end of the Y-phase armature coil 31 is connected to the junction between the anode of the diode 42 and the cathode of the Schottky barrier diode 45.

Further, the diode 43, Schottky barrier diode 46 and MOSFET 49 are connected in series in this order. The diode 43 and Schottky barrier diode 46 are connected such that the forward directions of the same are identical. The cathode of the diode 43 is connected to the output terminal 60 of the alternator. The anode of the Schottky barrier diode 46 is connected to the ground through the MOSFET 49. The parasitic diode 53 of the MOSFET 49 is set to have its forward direction in opposition to that of the Schottky barrier diode 46. One output end of the Y-phase armature coil 31 is connected to the junction between the anode of the diode 43 and the cathode of the Schottky barrier diode 46.

Figure 2:
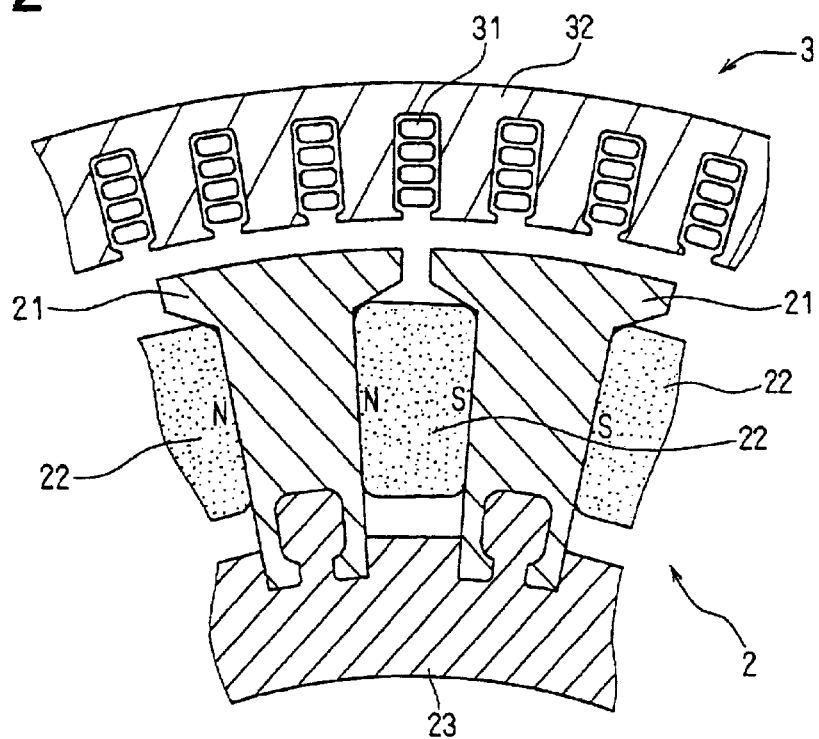
FIG. 2 is a sectional view of a part of the alternator shown in FIG. 1.

As shown in FIG. 2, the rotor 2 is constructed with a plurality of stacked cores 21 separated in the circumferential direction, a plurality of permanent magnets 22 disposed between adjacent two of the stacked cores 21, and a cylindrical body 23 fixedly supporting the stacked cores 21 thereon. Each stacked core 21 has its outer end part widened in the circumferential direction than its inner end part fixed to the cylindrical body 23. This widened outer end part restricts the permanent magnet 22 from disengaging from the stacked cores 21 in the radially outward direction due centrifugal force when rotated. This widened outer end part increases an area of facing of the stacked core 21 with the stator 3. Each permanent magnet 22 is so magnetized and arranged that its N-pole and S-pole appear alternately in the circumferential direction. Thus, the stacked cores 21 are magnetized to the N-pole and S-pole alternately in the circumferential direction.

The stator 3 is constructed with the armature coils 31 and a cylindrical stator core 32 having a plurality of slots. Each armature coil 31 is disposed within the slot by four turns.

In operation, the rotor 2 is driven by an internal combustion engine (not shown) and generates a rotating magnetic field that is an alternating magnetic field. As the magnetic flux generated by each permanent magnet 22 and passing through adjacent two stacked cores 21 cross the armature coils 31, the armature coils 31 generate alternating current voltages. This output voltages are applied to the rectifier circuit 4.

When the MOSFETs 47, 48, 49 are turned on, the rectifier circuit 4 operates as a three-phase full-wave rectifier circuit to supply the output current to the battery and the electric loads through the output terminal 60.

The MOSFETs 47, 48, 49 interrupt current supply paths of the output current when turned off, thus stopping output power generation and the supply of output current to the battery and the like. In this instance, the Schottky barrier diodes 44, 45, 46 connected between the armature coils 31 and the MOSFETs 47, 48, 49 restrict high voltages induced in the armature coils 31 from being applied to the MOSFETs 47, 48, 49, respectively. Thus, the output power generation of the armature coils 31 can be regulated by controlling the switching operation of the MOSFETs 47, 48, 49.

Further, because the parasitic diodes 51, 52, 53 are connected in series with the Schottky barrier diodes 44, 45, 46 in reverse-biased relation to each other, no current flows in the parasitic diode 51, 52, 53 when the output power generation is stopped. Thus, the MOSFETs 47, 48, 49 are protected from being broken down by the high voltages induced when the output power generation is stopped, even if the withstanding voltage of the MOSFETs 47, 48, 49 is low.

The forward voltage of the Schottky barrier diodes 44, 45, 46 connected in series with the MOSFETs 47, 48, 49 is lower than that of normal diodes. Therefore, the loss caused by the series connection of the Schottky barrier diode and the MOSFET is maintained to be minimal. Because the Schottky barrier diodes 44, 45, 46 are connected in series with normal diodes 41, 42, 43, leak currents that flow in the reverse direction due to the Schottky barrier diodes 44, 45, 46 are interrupted by the diodes 41, 42, 43. Thus, when the rotor 2 stops rotation, the dark current is restricted from flowing from the battery.

An alternator that has the above construction and produces output power of about 100A was trial-manufactured. The alternator resulted in the stator diameter of 93 mm, total weight of 3 kg, and power generating efficiency of 80%. The conventional alternator that has an electrically-excited field coil on a rotor to produce the same output power of about 100A generally has the rotor diameter of 130 mm, total weight of 6.5 kg, and power generation efficiency of 60%. It is clear from this comparison that the alternator according to the present embodiment is advantageous over the conventional one in that the weight is reduced by as much as 50% and the power generating efficiency is increased (driving torque is reduced) by as much as 35%.

In the above embodiment, the series connection of the Schottky barrier diodes 44, 45, 46 and the MOSFETs 47, 48, 49 may be provided not at the negative potential (ground) side but at the positive potential side from the armature coils 31. In this instance, the Schottky barrier diodes 44, 45, 46 should be connected between the MOSFETs 47, 48, 49 and the armature coils 31. Further, in the above embodiment, the Schottky barrier diodes 44, 45, 46 may be replaced with normal diodes.

What is claimed is:

1. A vehicle alternator comprising:
    a rotor having permanent magnets;
    a stator having armature coils for generating alternating current outputs in response to rotation of the permanent magnets of the rotor; and
    a rectifier circuit for converting the alternating current outputs to a direct current output,
    wherein the rectifier circuit includes series connections of a first end of a first diode with a FET having a second diode as a parasitic diode, each of the series connections being connected to each of the armature coils by a second end of the first diode, and
    wherein the first diode and the second diode are arranged in each of the series connections so that forward directions of the first diode and the second diode are opposite.

2. The vehicle alternator as in claim 1, wherein the first diode is a Schottky barrier diode.

3. The vehicle alternator as in claim 1, wherein the rectifier circuit further includes a third diode connected in series to each of the series connections, so that the first diode and the third diode full-wave rectifies the alternating current output under a condition that the FET is turned on.

4. The vehicle alternator as in claim 3, wherein the first diode has a forward voltage lower than that of the third diode.

5. The vehicle alternator as in claim 1, wherein the first diode is connected between the armature coil and the FET.

6. The vehicle alternator as in claim 1, wherein the rectifier circuit includes full-wave rectifying bridges corresponding to output terminals on which the alternating current outputs appear respectively, each of the full-wave rectifying bridges includes a negative potential side and a positive potential side, and each of the full-wave rectifying bridges has the series connection of the first diode and the FET provided at the negative potential side or the positive potential side.

7. A vehicle alternator comprising:
    a rotor for generating a fixed rotating magnetic field when rotated;
    a stator having armature coils for generating alternating current outputs in response to the fixed rotating magnetic field; and
    an electric circuit including rectifying diodes connected in a full-wave rectifier bridge configuration for converting the alternating current outputs to a direct current output,
    wherein the electric circuit further includes FETs, each FET connected to corresponding plurality of rectifying diodes for controlling output power generation of the armature coils when turned off, and
    wherein the FET is arranged so that parasitic diode thereof is biased in reverse to the corresponding rectifying diodes.

8. The vehicle alternator as in claim 7, wherein:
    the electric circuit has series connections in correspondence to the armature coils;
    each of the series connections includes series-connected first and second rectifying diodes and FET;
    each of the armature coils is connected to a junction between the first and the second rectifying diodes; and
    the first diode connected to the FET in one arm of the bridge configuration has a forward voltage lower than the second diode.

9. The vehicle alternator as in claim 7, wherein the rotor is a permanent magnet type, and the rectifying diodes and the FETs are connected in series, respectively.

* * * * *